US005473229A

United States Patent [19]
Archer et al.

[11] Patent Number: 5,473,229
[45] Date of Patent: Dec. 5, 1995

[54] INTERFACE BETWEEN PROGRAMMABLE ELECTRONICALLY COMMUTATED MOTOR AND PERSONAL COMPUTER AND METHOD OF OPERATION

[75] Inventors: William R. Archer; Roger C. Becerra; Brian L. Beifus; Kenneth E. Zick, all of Fort Wayne, Ind.

[73] Assignee: General Electric Company, Fort Wayne, Ind.

[21] Appl. No.: 421,291

[22] Filed: Apr. 13, 1995

Related U.S. Application Data

[63] Continuation of Ser. No. 34,718, Mar. 22, 1993, abandoned, which is a continuation-in-part of Ser. No. 889,708, May 27, 1992.

[51] Int. Cl.$^6$ ......................................... H02B 7/00
[52] U.S. Cl. ........................................ 318/254; 364/551.01
[58] Field of Search ........................... 318/254, 439, 318/138, 778, 782, 783, 798–815, 471, 641; 73/660, 862.045, 862.06, 862.08, 862.16, 862.18, 862.27, 862.193; 364/480, 483, 556, 557, 424.01, 551.01, 552

[56] References Cited

U.S. PATENT DOCUMENTS

| | | |
|---|---|---|
| 3,853,174 | 12/1974 | Kramer . |
| 3,877,243 | 4/1975 | Kramer . |
| 4,015,182 | 3/1977 | Erdman . |
| 4,075,864 | 2/1978 | Schrader . |
| 4,167,966 | 9/1979 | Freeman . |
| 4,250,544 | 2/1981 | Alley . |
| 4,267,967 | 5/1981 | Beck et al. . |
| 4,271,898 | 6/1981 | Freeman . |
| 4,346,434 | 8/1982 | Morinaga . |
| 4,389,853 | 6/1983 | Hile . |
| 4,390,826 | 6/1983 | Erdman et al. . |
| 4,415,844 | 11/1983 | Mendenhall et al. . |
| 4,459,519 | 7/1984 | Erdman . |
| 4,467,617 | 8/1984 | Morgan et al. . |
| 4,495,450 | 1/1985 | Tokiozaki et al. . |
| 4,500,821 | 2/1985 | Bitting et al. . |
| 4,540,921 | 9/1985 | Boyd, Jr. et al. . |
| 4,636,936 | 1/1987 | Boyd, Jr. et al. . |
| 4,642,536 | 2/1987 | Boyd, Jr. et al. . |
| 4,642,537 | 2/1987 | Young . |
| 4,648,551 | 2/1987 | Thompson et al. . |
| 4,653,285 | 3/1987 | Pohl . |
| 4,667,480 | 5/1987 | Bessler . |
| 4,669,040 | 5/1987 | Pettit et al. . |
| 4,682,473 | 7/1987 | Rogers, III . |
| 4,688,547 | 8/1987 | Ballard et al. . |
| 4,712,050 | 12/1987 | Nagasawa et al. . |
| 4,721,896 | 1/1988 | Klinger ................................. 318/685 |
| 4,722,018 | 1/1988 | Pohl . |
| 4,736,143 | 4/1988 | Nabanoura et al. . |
| 4,743,815 | 5/1988 | Gee et al. . |
| 4,754,405 | 6/1988 | Foster . |
| 4,773,587 | 9/1988 | Lipman . |
| 4,860,231 | 8/1989 | Ballard et al. . |

(List continued on next page.)

Primary Examiner—Jonathan Wysocki
Attorney, Agent, or Firm—Ralph E. Krisher, Jr.

[57] ABSTRACT

A microcontroller with external memory interacts with a host computer or terminal via a fully isolated RS232 serial interface. An eight-bit D/A converter transforms signals generated digitally in the microcontroller. The low level analog signal at the D/A output is further amplified in a power amplifier which supplies a signal to the motor terminals of the motor to be programmed via solid state relays. The solid state relays form an array of switches which are selectively closed by a low level digit signal generated by the microcontroller and processed by digital circuits. Four signals may be modulated with a signal representing the line frequency and are used specifically in an emulation mode. The interface receives multi-function feedback signals (RPM) from the motor such as speed, memory, content, and diagnostic information. Comparators provide an integrity check of the connections (cable) and the input section of the motor (optocouplers). The comparators compare voltages and currents of a selected motor signal against pre-defined threshold levels.

24 Claims, 7 Drawing Sheets

U.S. PATENT DOCUMENTS

| | | |
|---|---|---|
| 4,868,467 | 9/1989 | Davis . |
| 4,879,502 | 11/1989 | Erile et al. . |
| 4,902,952 | 2/1990 | Lavery . |
| 4,941,325 | 7/1990 | Nuding . |
| 4,950,918 | 8/1990 | Breartuin et al. . |
| 4,992,715 | 2/1991 | Nahamura et al. . |
| 5,047,700 | 9/1991 | Szakaly ................................. 318/568.1 |
| 5,107,685 | 4/1992 | Kobayashi . |
| 5,119,071 | 6/1992 | Talzozaina et al. . |
| 5,170,344 | 12/1992 | Berton et al. . |
| 5,202,951 | 4/1993 | Doyle . |
| 5,319,297 | 6/1994 | Bahn ..................................... 318/701 |
| 5,331,538 | 7/1994 | Digiulio et al. ....................... 364/134 |

FIG_1

FIG_2

FIG_3B

FIG_7A

FIG_7B

FIG_8

FIG_9

INTERFACE BETWEEN PROGRAMMABLE ELECTRONICALLY COMMUTATED MOTOR AND PERSONAL COMPUTER AND METHOD OF OPERATION

CROSS-REFERENCE TO RELATED APPLICATION

This is a continuation of application Ser. No. 08/034,718 filed on Mar. 22, 1993 now abandoned, which is a continuation-in-part of coassigned, copending application Ser. No. 07/889,708, filed May 27, 1992 titled Multiparameter ECM and Control Therefor, the entire disclosure of which is incorporated herein by reference.

BACKGROUND OF THE INVENTION

Experience has shown that electronically commutated motors provide one of the most efficient and most reliable motor designs for various types of applications. In general, electronically commutated motors have been designed for specific applications and to meet particular needs. Frequently, the various operating characteristics of electronically commutated motors overlap so that two different motor designs have very similar physical and/or electronic components. The above-identified coassigned, copending application suggests that many different motor configurations can be met be a single electronically commutated motor which can be programmed with specific operating parameters. As a result, there is a need for a system for programming such motors. In particular, there is a need for a simple and efficient way of permitting a customer to maintain an inventory of programmable motors and to program the motors accurately and quickly as there is a need for the motors and with the ability of the programmed motor to meet different, specific requirements.

SUMMARY OF THE INVENTION

It is an object of this invention to provide a system interface which accesses the non-volatile memory of an electronically commutated motor so that the motor may be programmed with particular operating parameters. It is another object of this invention to provide a system interface which sets an electronically commutated motor in various test modes for the purposes of torque calibration, product configuration, checks of integrity of various elements of the electronically commutated motor controls and other testing. It is yet another object of this invention to provide a system interface which sets an electronically commutated motor in an emulation node. It is still another object of this invention to provide an interface including a microcomputer based system which permits communication with a host computer, communication with an electronically commutated motor drive and which provides means for powering up an electronially commutated motor drive in a safe and efficient manner.

The invention comprises a system for programming a motor having a programmable nonvolatile (PNV) memory storing motor operating parameters which control the motor operation, said motor having a motor connector for accessing the PNV memory. The system comprises a computer and an interface. The computer, having input means responsive to an operator, provides to the computer desired motor operating parameters and has output means providing computer output signals representative to the desired operating parameters. The interface has means for receiving the computer output signals, means for engaging the motor connector and means for providing programming signals to the PNV memory via the motor connector engaging means. The programming signals provide motor operating parameters which are stored in the PNV memory whereby motor operation, as controlled by the motor operating parameters in the PNV memory, is programmed by the computer in response to operator input provided via the input means so that the motor operation corresponds to the desired motor operating parameters.

The invention also comprises a system having a motor, computer and interface. The motor has a programmable, non-volatile memory storing motor operating parameters which control the motor operation and a motor connector for accessing the memory. The computer has input means responsive to an operator for providing to the computer desired motor operating parameters and has output means providing computer output signals representative to the desired operating parameters. The interface has means for receiving the computer output signals, means for engaging the motor connector and means for providing programming signals to the PNV memory via the motor connector engaging means. The programming signals provide motor operating parameters which are stored in the PNV memory whereby motor operation, as controlled by the motor operating parameters in the PNV memory, is programmed by the computer in response to operator input provided via the input means so that the motor operation corresponds to the desired motor operating parameters.

The invention also comprises an interface for programming a motor having a programmable nonvolatile (PNV) memory storing motor operating parameters which control the motor operation, said motor having a motor connector for accessing the PNV memory. The interface is for use with input means responsive to an operator for providing to the interface output signals representative of the desired motor operating parameters. Means receives the output signals. Means engages the motor connector. Means provides programming signals to the PNV memory via the motor connector engaging means. The programming signals provide motor operating parameters which are stored in the PNV memory whereby motor operation, as controlled by the motor operating parameters in the PNV memory, is programmed by the interface in response to operator input provided via the input means so that the motor operation corresponds to the desired motor operating parameters.

The invention also comprises a method for programming a motor having a programmable nonvolatile (PNV) memory storing motor operating parameters which control the motor operation, the motor having a motor connector for accessing the PNV memory. The method comprises the steps of: providing to an interface operator input corresponding to output signals representative to the desired operating parameters; interconnecting the motor connector and the interface; and providing programming signals to the PNV memory via the motor connector engaging means. The programming signals provide motor operating parameters which are stored in the PNV memory whereby motor operation, as controlled by the motor operating parameters in the PNV memory, is programmed in response to operator input provided via the input means so that the motor operation corresponds to the desired motor operating parameters.

The invention also comprises an interface for programming a device having a programmable nonvolatile (PNV) memory storing device operating parameters which control the device operation, the device having a device connector for accessing the PNV memory, the interface for use with input means responsive to an operator for providing to the interface output signals representative of the desired device operating parameters. Means receives the output signals. Means engages the device connector. Means provides programming signals to the PNV memory via the device connector engaging means. The programming signals provide device operating parameters which are stored in the PNV memory whereby device operation, as controlled by the device operating parameters in the PNV memory, is programmed by the interface in response to operator input provided via the input means so that the device operation corresponds to the desired motor operating parameters.

The invention also comprises a system comprising a device, a computer and an interface. The device has a programmable, non-volatile memory storing device operating parameters which control the device operation, the device having a device connector for accessing the memory. The computer has input means responsive to an operator for providing to the computer desired device operating parameters and has output means providing computer output signals representative to the desired operating parameters. The interface has means for receiving the computer output signals, means for engaging the device connector and means for providing programming signals to the PNV memory via the device connector engaging means. The programming signals provide device operating parameters which are stored in the PNV memory whereby device operation, as controlled by the device operating parameters in the PNV memory, is programmed by the computer in response to operator input provided via the input means so that the device operation corresponds to the desired device operating parameters.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE PREFERRED EMBODIMENTS

Figure 1:
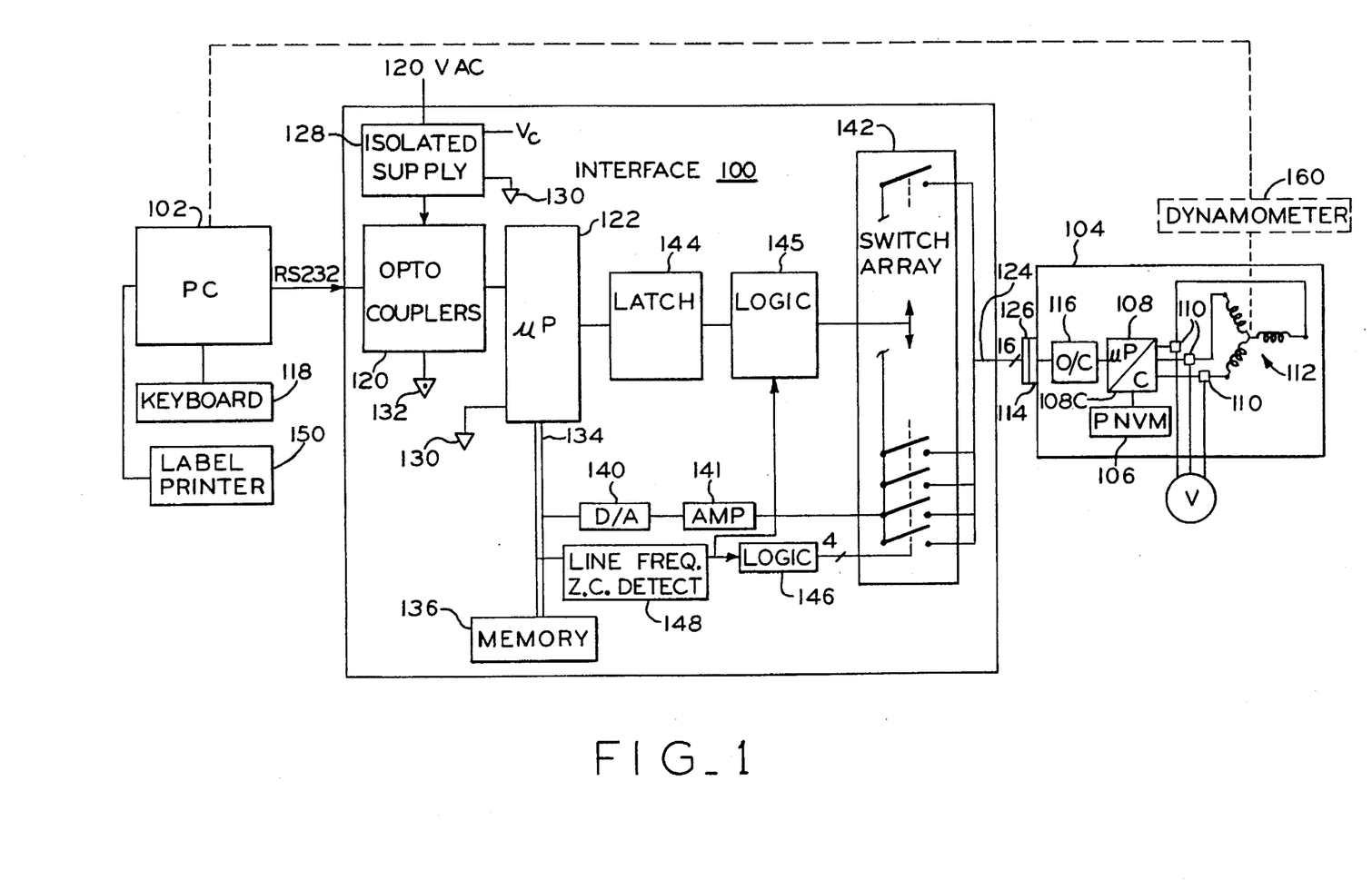
FIG. 1 illustrates a block diagram of a personal computer and an interface for programming an electronically commutated motor according to the invention.

FIG. 1 shows a block diagram of one preferred embodiment of the system according to the invention. An interface 100 is a circuit located between a personal computer 102 and an integrated control electronically commutated motor (ICM) 104 for programming ICM 104. ICM 104 includes a programmable non-volatile (PNV) memory 106 within which is stored motor operating parameters (calibration factors) which control the motor operation. For example, ICM 104 may be of the type as disclosed in Ser. No. 07/889,708, filed May 27, 1992, noted above. The ICM 104 includes a motor control having a microprocessor 108 which controls a dedicated ICM controller circuit 108C such as an application specific integrated circuit (ASIC) which controls power switching devices 110 for commutating the motor windings 112. The ICM has a signal input connector 114, such as a 16 pin connector, which is normally engaged by a system controller which provides signals to which ICM 104 responds. In addition, interface 100 may be connected to ICM 104 via connector 114 so that information may be provided to or from the microprocessor 108 via an isolating device such as an array of optical couplers 116. The microprocessor 108 stores received information in the programmable non-volatile memory 106 for use in controlling the speed and/or torque of the ICM 104.

Personal computer 102 has an input means such as a keyboard 118 responsive to an operator's input for providing to the personal computer 102 the desired motor operating parameters. For example, personal computer 102 may have a database of various sets of parameters or tables listing various parameters which the operator can select. Alternatively, the operator may manually input desired operating parameters for the particular electronically commutated motor 104 to be programmed. Computer 102 has an output means such as an RS232 serial communication port providing standard computer output signals representative of the desired operating parameters input by the operator.

Interface 100 has means for receiving the computer output signals such as an array of opto-couplers 120 which provide isolation between the computer 102 and the interface 100. In particular, opto-couplers 120 isolate a microprocessor 122 which controls the operation of the interface 100. Essentially, microprocessor 122 is responsive to the computer output signals and generates programming signals which are provided to the ICM 104 via an output port for engaging the motor input connector 114 such as a 16 wire cable 124 and 16 pin connector 126 for engaging input connector 114. The programming signals provide motor operating parameters which are stored in the PNV memory 106 of the ICM 104. As a result, motor operation, as controlled by the motor operating parameters stored in the PNV memory 106, is programmed by the computer 102 in response to operator input via keyboard 118 so that the operation of ICM 104 corresponds to the desired motor operating parameters input by the operator.

Preferably, the PNV memory 106 consists of two areas. One are contains the specific information of the drive including calibration parameters. This area is programmed at the factory and is normally not accessible for modification by an end user via the use of interface 100. The other area contains application specific information and may be modified at the user's factory. Application specific files may be developed by the user employing software in personal computer 102. Preferably, the software allows the user to develop specific applications by stepping through questions in a non-technical fashion. The created files can be written in the memory 106 through interface 100.

Interface 100 is preferably a single board unit powered with 120 volts ac which is connected to a power supply 128. Communication between the interface 100 and the personal computer 102 is via RS232 interface with a selectable baud rate. The interface 100 is connected to ICM 104 via signal cables 124.

The interface 100 of the invention may operate in many different modes. In an emulation mode, the interface 100 intimates operation of the motor 104 in a particular environment. In a calibration mode, which may be included in and which may be a part of the emulation mode, the operating characteristics of the motor 104 are adjusted to agree with a standard. In a programming mode, which may be included in and which may be a part of the emulation or calibration modes, interface 100 accesses memory 106 of motor 104 for both reading and writing purposes including providing motor operating parameters.

In one example of the emulation mode, interface 100 may operate to exercise the inputs and outputs of ICM 104 to emulate performance of the motor driving a component in a specific environment. As another example of the emulation mode which includes calibration, interface 100 may also operate in a closed loop operating mode. For closed loop operation, an external device such as a dynamometer 160 may be driven by ICM 104, which would be externally powered and controlled by operating signals. In closed loop operation, the motor operating parameters could be varied to vary torque as measured by the dynamometer.

In an example of the calibration mode, ICM 104 may drive a blower and interface 100 may be used to customize and calibrate ICM 104 to achieve certain air flow rates.

In the programming mode, in addition to accessing memory 106, interface 100 performs tests on the cable 124 and optocoupler 116 to verify their integrity. Generally, no memory access will be permitted in the event that the motor 104 is found defective.

Interface 100 may operate in a stand-alone mode without computer 102. In this case, commands to microprocessor 122 may be provided directly by a keyboard or other input means connected to the microprocessor 122.

Preferably, interface 100 provides double isolation between the computer 102 and the ICM 104. In particular, it is preferable that power supply 128 be referenced to a ground 130 which is isolated from and independent to a floating ground 132 to which the optocoupler 120 and their associated circuitry is referenced. As a result, the reference point for data communicated between the interface 100 and the computer 102 via RS232 is floating (isolated) ground 132 whereas the reference point for data communicated between the interface 100 and the ICM 104 is ground 130.

The microprocessor 122 of interface 100 is connected to a data bus 134 which transmits and receives data information within the interface and its peripheral components. In particular, memory 136 having various data and programming instructions is connected to data bus 134.

Memory 136 supplies data information to a digital/analog converter 140 which converts digital signals into analog signals which are provided to an input side of an array of switches 142. The opening and closing of each of the switches in the switch array 142 is controlled by latches 144 and logic 145 which control the upper eight switches of switch array 142. In addition, the lower four switches of switch array 142 may be controlled by logic 146 associated with a 50/60 Hz line frequency zero cross detector 148 so that these switches may be modulated at 50/60 Hz to simulate an ac line cycle. The latter four switches are used in various emulation modes.

Also, a label printer 150 is connected to the personal computer 102. The purpose of the label printer is to print a label for the particular ICM 104 which is being programmed. Preferably, the label includes the particular motor operating parameters with which ICM 104 has been programmed. The label would be attached to ICM 104 after programming so that a user of ICM 104 could reference the label to determine the manner in which ICM 104 has been programmed.

Figure 2:
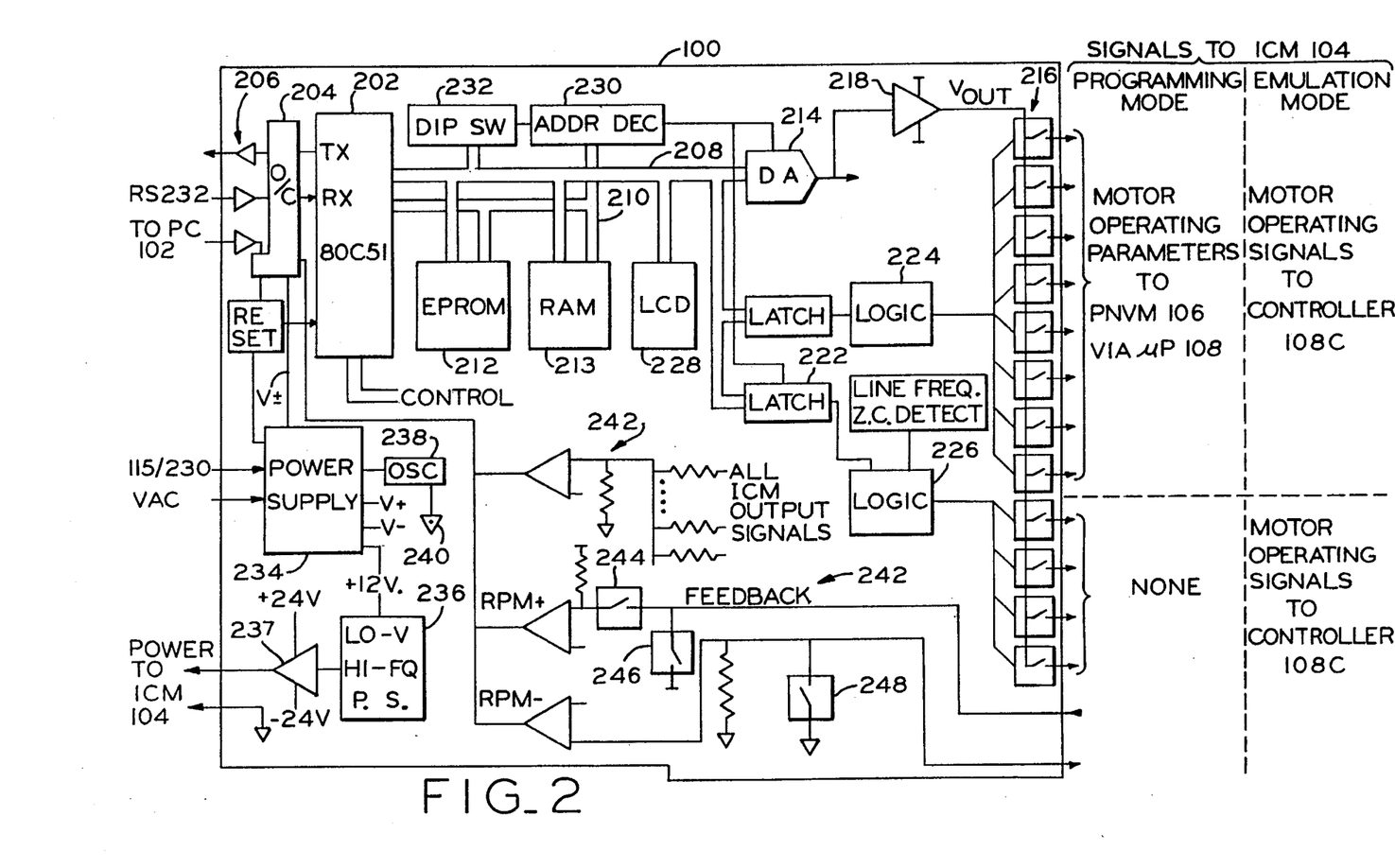
FIG. 2 illustrates a detailed block diagram of one preferred embodiment of the interface between the personal computer and the electronically commutated motor according to the invention.
Figure 3A:
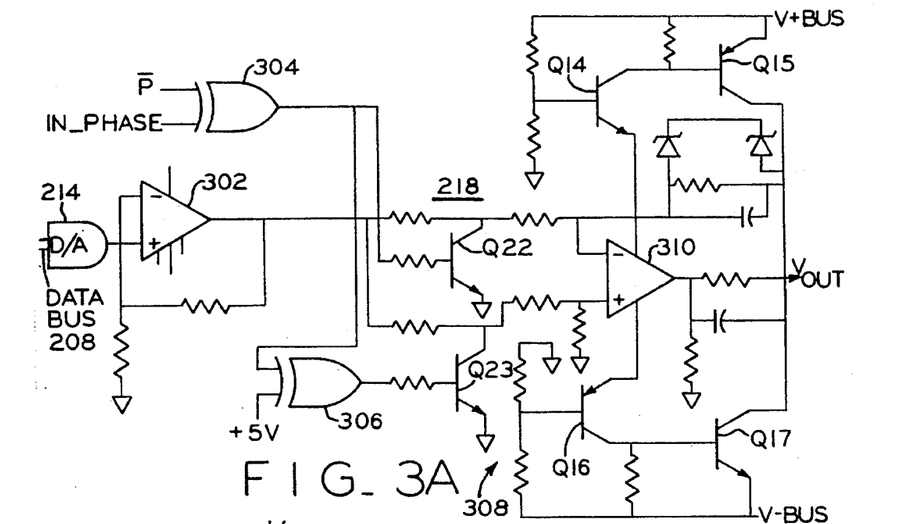
FIG. 3A illustrates a schematic diagram of one preferred embodiment of an amplifier 218 for generating the output voltage from the analog to digital converter according to the invention.
Figure 3B:
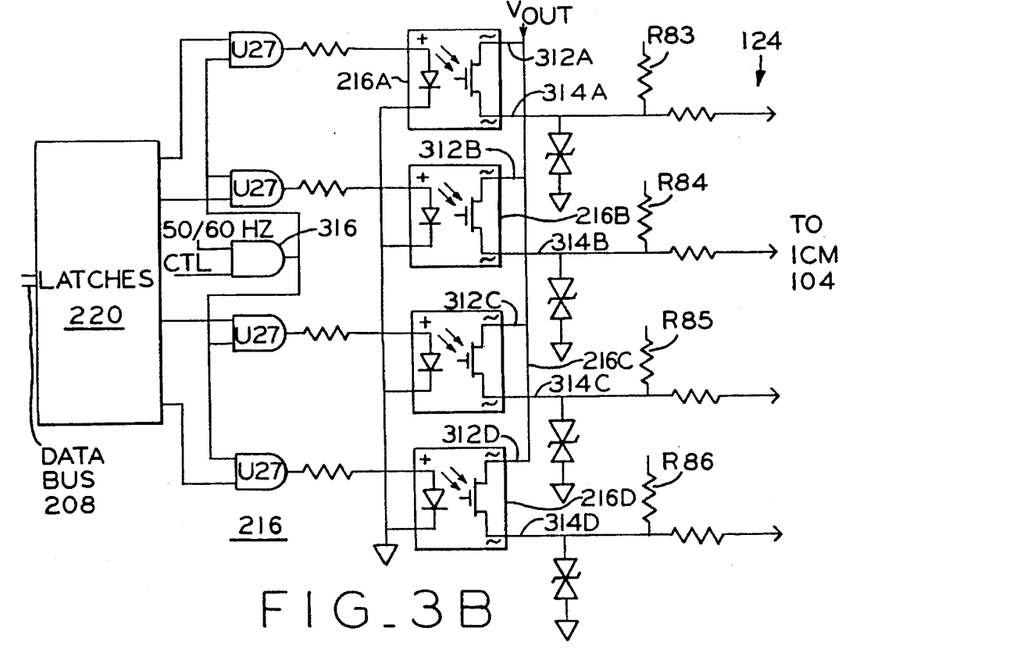
FIG. 3B illustrates a schematic diagram of one preferred embodiment of four of the switches of the switch array 216 of the invention.

FIG. 2 is a detailed block diagram of the interface 100 shown in FIG. 1. Preferably, an Intel 80C51 microprocessor 202 communicates via the RS232 port in a transmit (TX) mode and in a receive (RX) mode with the personal computer being used by the operator. Interface 100 includes an output port having an array of opto-couplers 204 and buffers 206 between the RS232 port of computer 102 and microprocessor 202. Microprocessor 202 has both a data bus 208 and an address bus 210 for controlling the memory, logic and latches of the interface 100. In particular, the data bus 208 is connected to an erasable, programmable, read only memory (EPROM) 212 in which an operating program is stored. For example, a software program of the type illustrated in Appendix A hereto partitioned according to Appendix B hereto may be stored in EPROM 212. In addition, data bus 208 is connected to working memory such as random access memory (RAM) 214 for temporarily storing and processing information. The data bus 208 is also connected to a digital/analog (D/A) converter which converts digital data signals supplied thereto into analog signals impressed upon each of the inputs of the switch array 216 after amplification by an amplifier 218. FIGS. 3A and 3B illustrate preferred embodiments of amplifier 218 and switch array 216, respectively. The data bus 208 also supplies data to latches 220 and 222 for respectively controlling logic 224 and 226 which controls the state of the switches in array 216. Optionally, the data bus 208 may be connected to a liquid crystal display (LCD) 228 for indicating the functional operation of interface 100. The address bus 210 is connected to EEPROM 212, RAM 213, and an address decoder 230 in order to provide clocking signals to the D/A converter 214 and latches 220 and 222.

In addition, a set of dip switches 232 may be connected to the data bus 208 to set various modes of operation of interface 100 such as baud rate. Microprocessor 202 would routinely query dip switches 232 to find out the type of mode in which it should operate.

Figure 4A:
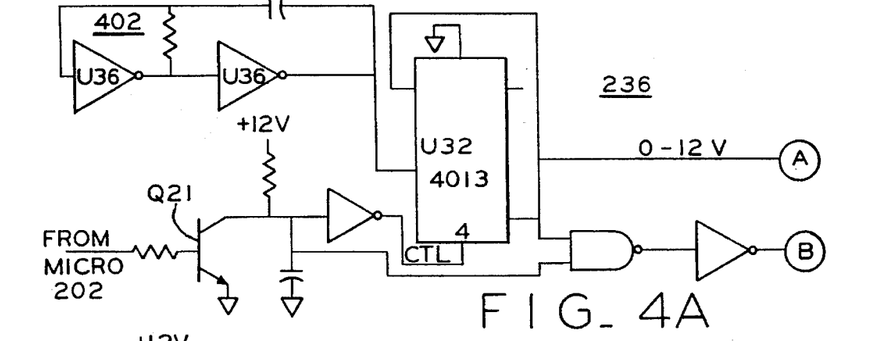
FIGS 4A and 4B illustrate a schematic diagram of one preferred embodiment of a low voltage, high frequency power supply 236 for powering the ICM with FIG. 4A showing the oscillator portion of the power supply and FIG. 4B showing the power amplifier portion of the power supply.
Figure 4B:
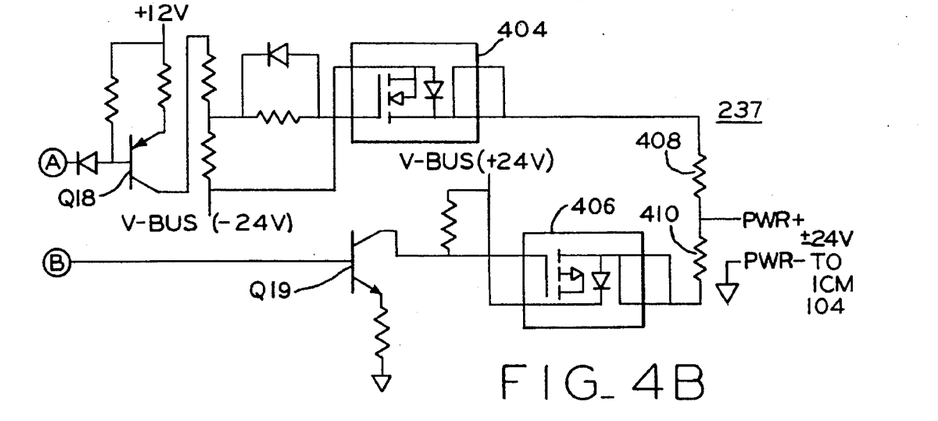
Figure 9:
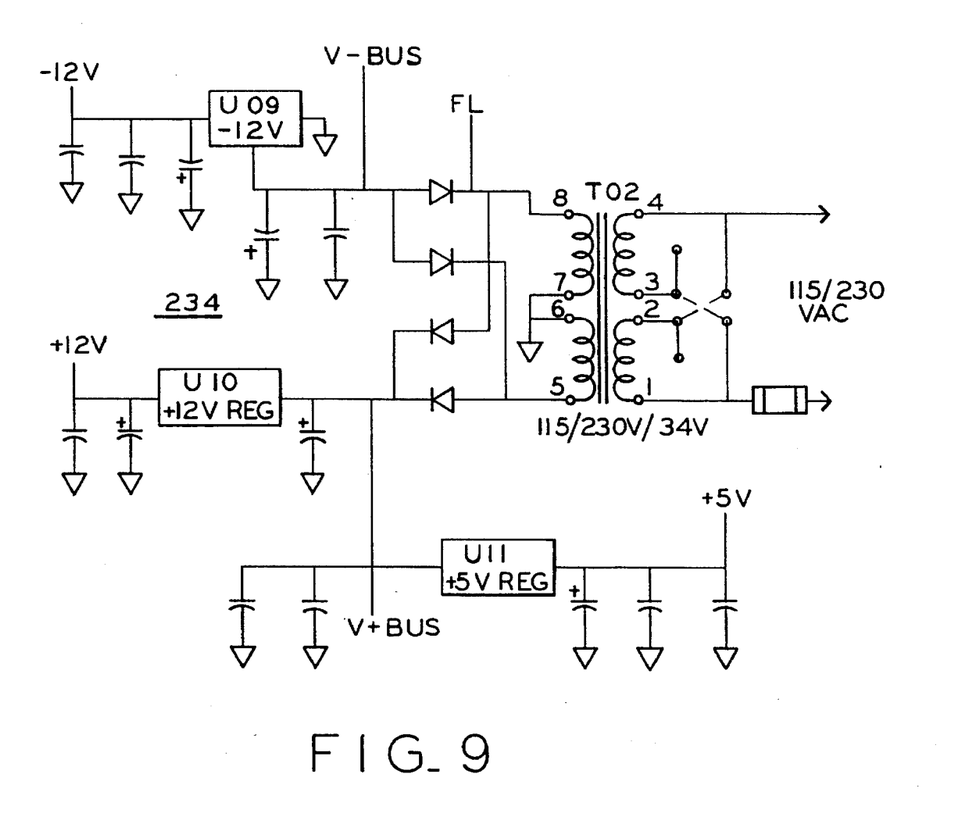
FIG. 9 illustrates a schematic diagram of one preferred embodiment of the power supply 234 of the interface according to the invention.

Interface 100 includes a power supply 234 connected to a 120 vac line for generating the various voltages required by the interface 100. FIG. 9 illustrates supply 234 in greater detail. Interface 100 also includes a power supply for supplying power to the ICM 104 in the form of a low voltage (LO-V), high frequency (HI-FQ) supply such as a 1 kHz oscillator 236 in combination with an amplifier 237. FIGS. 4A and 4B illustrate the oscillation and amplifier in greater detail.

In addition, power supply 234 drives a fully isolated, dual power supply 238 for the optical couplers 204 having a floating ground 240. This supply 238 is illustrated in greater detail in FIG. 5. FIG. 6 illustrates one preferred embodiment of the opto-coupler 204 in the form of a serial interface isolator.

In addition, interface 100 may be provided with an optional integrity testing circuit 242 for verifying the cable integrity between the interface 100 and ICM 104 and for verifying the operation of optocouplers 116 of ICM 104. In particular, microprocessor 202 controls the position of switches 244, 246, and 248 to verify that cable 124 properly interconnects interface 100 and ICM 104 and to verify the response of optocouplers 116. FIGS. 7A–7D and 8 illustrate one preferred embodiment of the integrity test circuit 242 and the operation of switches 244, 246, and 248 which will be described in greater detail below with respect thereto. The circuitry between each output of the switches of array 216 and the ICM 104 which is illustrated in more detail in FIG. 3B. All ICM output signals from interface 104 are compared to a reference (REF). The following Table 1 indicates the function of each output during programming of the ICM 104 and during operation of ICM 104.

TABLE 1

| Output | Function |
|---|---|
| W | programming/emulation |
| O | emulation |
| BK | programming/emulation |
| G | programmimg/emulation |
| R | programming/emulation |
| Y1 | emulation |
| Y2 | emulation |
| EM | emulation |
| HEAT | emulation |
| COOL | emulation |
| ADJ | emulation |
| DEL | emulation |
| RPM | programming/emulation |
| COM | ground |

Table 2 illustrates the commands from PC 102 and the response from interface 100.

TABLE 2

Command Set Summary

| PC Command | Description | Response from Interface |
|---|---|---|
| | Cable Integrity Check: | |
| Npv | New polarity and voltage | Npv |
| C | Cable continuity check | Cvir |
| Lv | Logic pattern output | Lv |
| V | Single line continuity | Vb |
| | Generalized Test and Power On/Off: | |
| A | Power-up + test mode access | A(ack/nak) |

TABLE 2-continued

Command Set Summary

| | | |
|---|---|---|
| P1 | Turn power on | P1 |
| P0 | Turn power off | P0 |
| | Calibration Test Mode: | |
| S | Power-up + calibrate mode access | |
| P | Proceed | |
| U | Up - raise torque | |
| D | Down - lower torque | |
| R | exit - cancel S mode | S |
| | Subtest Modes: | |
| B | Go to opto test mode | B(ack/nak) |
| D | Go to 25% torque mode | D(ack/nak) |
| E | Go to 75% torque mode | E(ack/nak) |
| G | Measure rpm (speed = 2512560/h1) | Gh1 |
| F | Stop motor | |
| I | Initialize ICM RAM from EEPROM report checksums good/bad | I(ack/nak) |
| | Memory Test: | |
| H | Go to EEPROM read/write mode | H |
| Ran | Read n bytes starting at addr a | Ran(data) |
| JEA | Erase all EEPROM | JEA |
| Wan(data) | Write n bytes starting at addr a | Wan(ack/nak) |
| K | Write same as prior W command | Kan(ack/nak) |
| Malh | Write single 16 bit location a with data 1h | Malh |
| | Miscellaneous Tests: | |
| Z | Read the on-board DIP switch | Zb |
| U1 | Set TIB internal measure mode | U1 |
| U0 | Cancel TIB internal measure mode | U0 |
| Tab | Thermostat emulation mode modulates output lines with 50/60 Hz | Tab |

Referring to FIG. 3A, a schematic diagram of one preferred embodiment of amplifier 218 for amplifying the analog signal provided by D/A converter 214 is illustrated. Amplifier 218 includes a buffer 302 in the form of a differential amplifier for receiving the analog signal. Gates 304 and 306 to selectively close either transistor Q22 or Q23 to configure amplifier 310 in either an inverting or noninverting mode so that an analog signal generated thereby may be amplified by an array of transistors 308 (Q14, Q15, Q16, Q17) and an amplifier 310. The circuit is configured such that the amplifier 218 provides a gain of 4.7 (positive or negative).

The voltage $V_{out}$ generated by amplifier 218 is supplied to each of the switches 216 as illustrated in FIG. 3D. FIG. 3B illustrates four switches of switch array 216. As indicated in FIG. 2, preferably twelve switches are employed to have twelve switch outputs which are part of the sixteen wire connection to ICM 104. For simplicity and convenience, only four of the twelve switches are illustrated in FIG. 3D. Each of the switches 216A–216D has an input 312A–312D to which the amplified voltage $V_{out}$ is supplied. Microprocessor 202 clocks signals through latches 220, which signals are applied to AND gates U27 to selectively close switches 216 and impress voltage $V_{out}$ on outputs 314A–314D of switches 216. The other input of AND gates U27 is connected to an AND gate 316 which selectively modulates at 50/60 Hz so that the output signals are similarly selectively modulated.

FIGS. 4A and 4B illustrate a schematic diagram of one preferred embodiment of the low voltage (±24 V), high frequency power supply 236 according to the invention. Power must be supplied to ICM 104 in order to energize its microprocessor and control circuitry so that information can be provided thereto and stored in its programmable non-volatile memory 106. For safety, such power should be the minimum voltage needed for energizing the ICM 104, which normally operates at 120/240 VAC. FIGS. 4A and 4B illustrate a one kHz oscillator which generates a low voltage (±24 V), high frequency (1 KHz), quasi-square wave signal sufficient to power the microprocessor 108 of ICM 104. The low voltage supply is derived from the power supply 234.

In FIG. 4A, one preferred embodiment of the oscillating circuit of the power supply 236 is illustrated. A pair of inverters U36 in series are part of an oscillating circuit 402 having a 2 KHz frequency. A ÷2 divider U32 reduces the oscillations in half in response to a control signal from the microprocessor provided via a pin 4. As a result, an output pin 2 of the divider U32 carries a 0–12 V signal which is controlled by microprocessor to provide a 50% duty cycle signal oscillating at 1 kHz. Divider U32 divides when a control signal is (ground potential) present at pin 4. This control signal permits the microprocessor to synchronize the control power applied to the ICM 104 to access PNVM 106.

In FIG. 4B, one preferred embodiment of the power amplifier of the supply 236 is illustrated. A transistor Q18 functions as an on/off control for a negative bus (V–BUS) power switch 404 and a transistor Q19 functions an an on/off control for a positive bus (V+BUS) power switch 406. Only one of switches 404, 406 is closed or "on" during any instant in time. Two resistors 408, 410 limit the current flow and combine time output of switches 404 and 406 to provide ±24 v power at 1 kHz.

Figure 5:
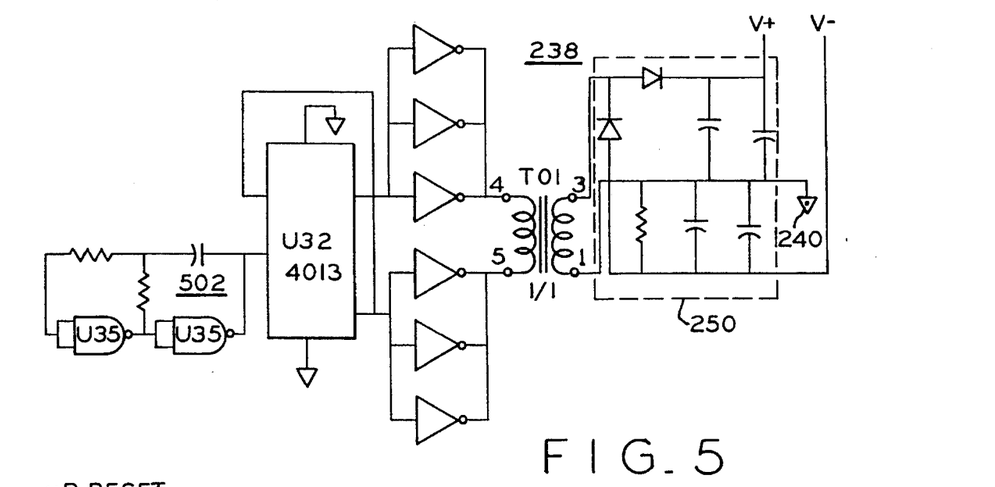
FIG. 5 illustrates a schematic diagram of one preferred embodiment of a fully isolated dual power supply 238 to power the driver used by the isolator 204 of the serial RS232 communication port.
Figure 6:
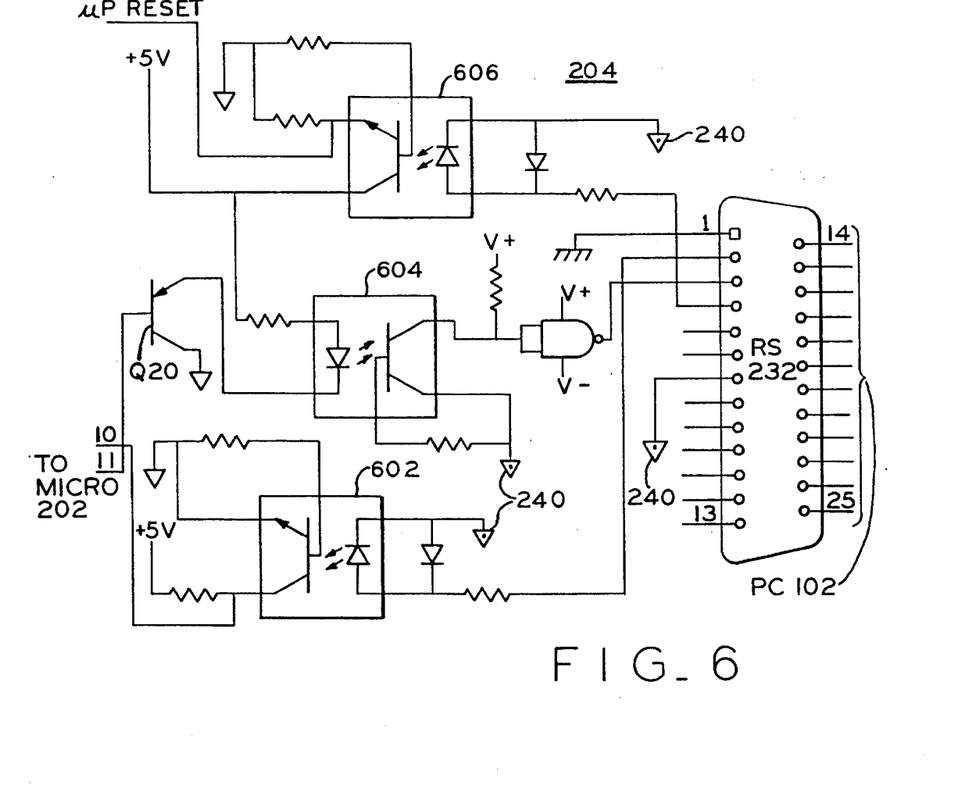
FIG. 6 illustrates a schematic diagram of the serial interface isolator 204 between the RS232 port of the computer and the microprocessor of the interface according to the invention.

Referring to FIG. 5, the fully isolated dual power supply 238 with floating ground 240 for the serial interface is illustrated. A pair of inverters U35 in series provide an oscillating circuit 502 having a 1.6 MHz frequency. A ÷2 divider U32 reduces the oscillations in half. A control ground on a pin 10 of the divider U32 permits it to operate continuously. Inverters U34 Supply the primary side of transformer T01 with enough current drive capability at an oscillating frequency of 800 kHz. The oscillating voltage available at the secondary side of transformer T01 is rectified and filtered by the elements of a circuit 250. A dual supply (V+ and V–) referenced to floating ground 240 is available at the output of circuit 250. These isolated supplies V+ and V– are used to drive the serial interface as shown in more detail in FIG. 6.

FIG. 6 illustrates, in schematic form, one preferred embodiment of the serial interface isolator 204 powered by the V+ and V– voltages. Lines 10 and 11 connected to microprocessor 102 are involved in the serial communication. These signals are referred to the control ground 130. Opto-couplers 602 and 604 provide isolation of the serial communication signals. The left side of FIG. 6 (terminals 1–13) is referred to the control ground 130 while the right side of FIG. 6 (terminals 14–25) is referred to floating ground 132. An opto-coupler 606 is also provided for transmitting a reset on signal from the personal computer 102 to microprocessor 202. Driver U02 employs the V+ and V– voltages generated by supply 204 shown in FIG. 5 to power the RS232 serial interface driver U02.

Figure 7A:
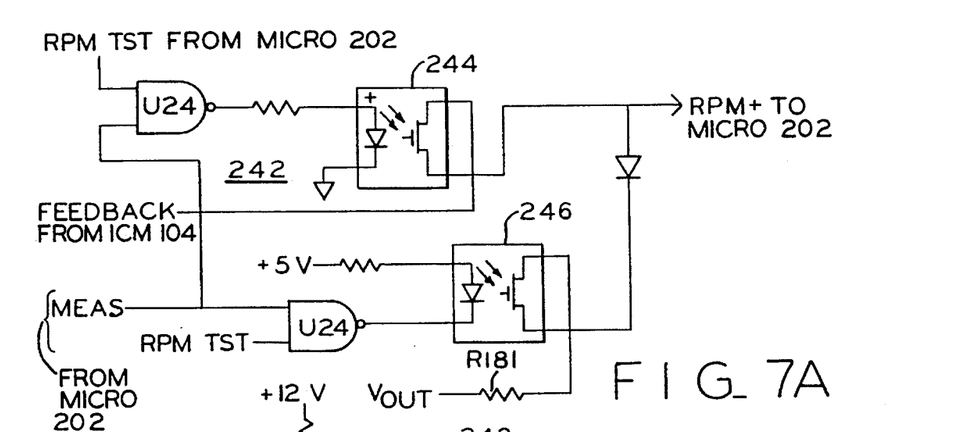
FIG. 7A illustrates a schematic diagram of one preferred embodiment of a circuit 242 used to provide an integrity check of the RPM+ line between the interface and the electronically commutated motor.

As indicated above, an integrity check is performed on the cabling between the interface and the electronically commutated motor to make sure each of the wires of the cable provides a closed circuit connection therebetween. FIG. 7A illustrates the circuit employed for testing the RPM+ line of the system. During an integrity check of the RPM+ line, both switch 244 is open and switch 246 is closed by an RPM test (RFM_TST) signal provided by the microprocessor in combination with a a measure signal (MEAS) so that a reference voltage Vout (negative polarity) is impressed on the RPM+ line as measured by resistor R105 of FIG. 7B. The voltage drop on this resistor indicates whether or not the RPM+ line is open-circuited.

Figure 7B:
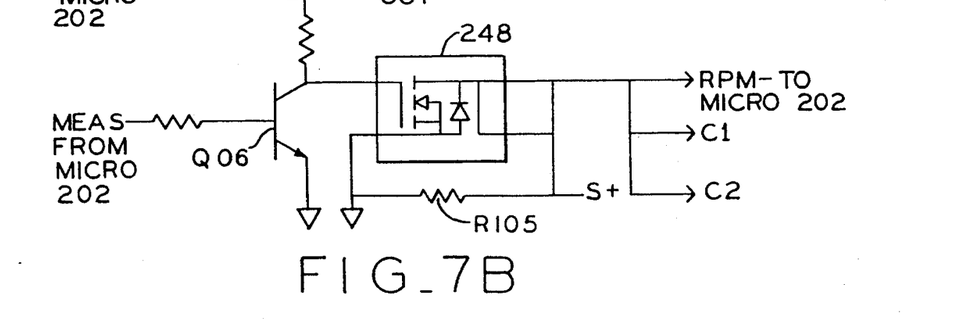
FIG. 7B illustrates a schematic diagram of one preferred embodiment of a circuit 242 used to provide an integrity check of the RPM-line (COM) between the interface and the electronically commutated motor.
Figure 7C:
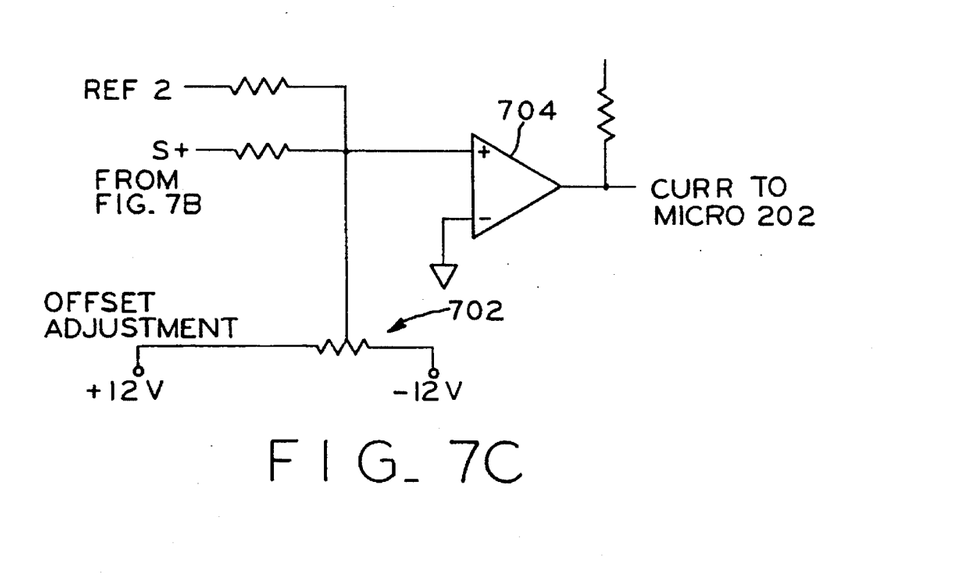
FIG. 7C illustrates a schematic diagram of one preferred embodiment of a circuit 242 used to detect the integrity of the input signals provided by the electronically commutated motor.
Figure 7D:
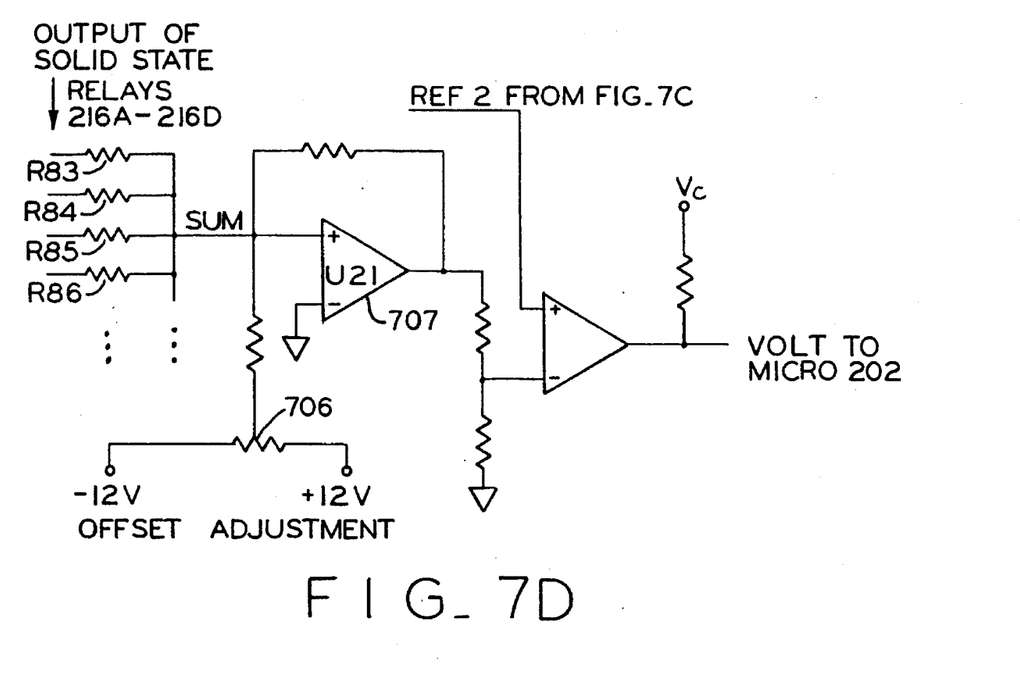
FIG. 7D illustrates a schematic diagram of one preferred embodiment of a circuit 242 used to detect the integrity of the programming interface outputs.

In FIG. 7B, switch 248 is closed during normal operation and is opened by the measure (MEAS) signal from the microprocessor to place resistor R105 in the RPM– line as a current sensing resistor to measure the voltage drop (S+) on the RPM– line (common) as a result of the ICM input signals under test. In FIG. 7C, integrity of the input signals provided by the ICM is tested by comparing a reference level voltage (REF2) against the voltage drop (S+) signal from the circuit shown in FIG. 7B. An offset adjustment is set by adjusting potentiometer 702 connected to a ±12 v reference. The output of comparator 704 provides a current (CURR) signal as a microprocessor input so that the microprocessor can verify the proper current level. This current signal indicates the status of the integrity of the ICM inputs. Also, the ICM lines are checked for integrity by a voltage check. FIG. 7D illustrates that resistors R83–R86 on the output side of the switches of the array 216 are summed, and offset adjustment is supplied by potentiometer 706. Sample voltage of selected signal(s) when the Measure Comamnd is applied (MEAS) is amplified by amplifier 707 and compared to reference voltage REF2 to provide a voltage output signal (VOLT) which is input into the microprocessor. If the summed, offset voltage does not reach a certain minimum, the output voltage signal (VOLT) will be low because it will be less than REF2 indicating to the microcontroller that at least one or more of the lines is open-circuited.

Figure 8:
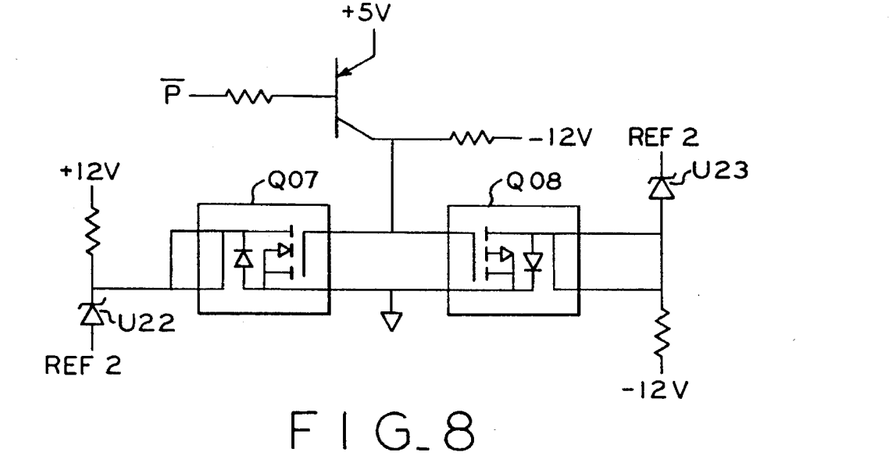
FIG. 8 illustrates a schematic diagram of one preferred embodiment of a circuit used to generate a reference voltage (REF2) used for current and voltage comparison during the integrity checking of the interface and the inputs from the electronically commutated motor.

FIG. 8 illustrates a schematic diagram of one preferred embodiment of a circuit used to generate the reference voltage REF2 used for current and voltage comparison during the integrity checking of the interface and the inputs from the electronically commutated motor. A $\bar{p}$ signal from the microprocessor controls the polarity of the reference voltage REF2 by selectively switching either transistor Q07 or Q08 to generate either a positive reference via voltage reference diode U22 or a negative reference via voltage reference diode U23. As indicated above, this reference voltage REF2 is used for current and voltage comparison to verify the integrity of the interface connection and the inputs from the electronically commutated motor.

FIG. 9 illustrates one preferred embodiment of the power supply 234. A step down transformer TO2 reduces the 115 vac or 230 vac line voltage to generate an unregulated V+BUS and V–BUS voltage. These voltages are used to drive either regulator U09 to provide a regulated –12 v voltage, regulator U10 to provide a regulated +12 v voltage or regulator U11 to provide a regulated +5 v voltage.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. An interface for programming a motor having a programmable nonvolatile (PNV) memory storing motor operating parameters which control the motor operation and having a motor control for operating the motor in accordance with the stored motor operating parameter and in response to motor operating signals, said interface for operating the programmed motor to emulate performance of the motor driving a component in a specific environment in order to achieve a desired motor performance, said motor having a motor input for accessing the motor operating parameters stored in the PNV memory and for receiving motor operating signals provided to the motor control for operating the motor, said interface for use with operator input means responsive to operator input for providing output signals representative of desired motor operating parameters for calibrating the motor and for specifying desired motor operating signals for emulating operation of the motor in the specific environment, said interface comprising:

an input port connected to the operator input means and receiving the output signals;

an output port connected to and engaging the motor input; and means for storing the motor operating parameters for calibrating the motor in the PNV memory via the interface output port and via the motor input;

means for providing the motor operating signals for emulating motor operation to the motor control via the interface output port and via the motor input;

means for measuring an output performance of the motor in response to the motor operating signals; and wherein the interface circuit is responsive to the operator input for varying the motor operating parameters so that the output performance as measured by the measuring means corresponds to the desired motor performance whereby motor operation, as controlled by the motor operating parameters in the PNV memory, is in response to the operator input provided via the input means so that the motor operation emulates the desired performance when driving the component in the specific environment.

2. The interface of claim 1 wherein the means for storing the motor operating parameters comprises:

a processor having an input for receiving signals from the input means from the computer;

a memory connected to the processor and including instructions for controlling the operation of the processor; and a circuit, response to the processor, for generating programming signals provided to the motor input which correspond to the motor operating parameters.

3. The interface of claim 2 wherein the programming signal generating circuit comprises an amplifier generating an output signal, an array of switches having inputs connected to the amplifier for receiving the output signal and having outputs connected to the motor, and means for selectively opening and closing the switches in response to data signals provided by the processor.

4. The interface of claim 3 wherein the amplifier comprises a digital-to-analog converter for converting digital signals provided by the processor and means for amplifying the analog signals provided by the converter thereby providing an amplified signal to the inputs of the switches.

5. The interface of claim 1 further comprising a high frequency, low-voltage power supply for generating a power signal for powering the motor.

6. The interface of claim 5 wherein the motor operates with a 115/230 vac line voltage and wherein the high frequency, low voltage power supply supplies a ±24 volt quasi-square wave oscillating at a frequency of 1 kHz.

7. The interface of claim 2 wherein the interface input port and the computer output each comprises an RS232 serial communication port, and further comprising an isolated, dual power supply to power a driver of the RS232 ports.

8. The interface of claim 7 wherein the isolated power supply has a floating ground.

9. The interface of claim 8 further comprising an array of optocouplers interconnecting the computer output and the processor input.

10. The interface of claim 1 further comprising means for verifying an electrical integrity of the connection between the interface output port and the motor input.

11. The interface of claim 10 wherein the verifying means comprises a circuit for testing whether the electrical connection between the interface output port and the motor input provides an open circuit or a closed circuit.

12. The interface of claim 11 wherein the testing circuit comprises means for impressing a voltage on one or more lines between the interface output port and the motor input and means for detecting the impressed voltage.

13. The interface of claim 11 wherein the circuit comprises means or detecting current on one or more lines between the interface output port and the motor input.

14. The interface of claim 1 further comprising means for printing labels indicating the motor operating parameters with which the PNV memory of the motor has been programmed.

15. The interface of claim 1 further comprising means for providing motor operating signals to the motor, said motor operating signals for operating the motor to emulate performance of the motor in a specific environment in order to achieve a desired motor performance.

16. The interface of claim 1 wherein the measuring means comprises a dynamometer.

17. A method for programming a motor having a programmable nonvolatile (PNV) memory storing motor operating parameters which control the motor operation and having a motor control for operating the motor in accordance with the stored operating parameters and in response to motor operating signals, providing an interface for operating the programmed motor to emulate performance of the motor driving a component in a specific environment in order to achieve a desired motor performance, said motor having a motor input for accessing the motor operating parameters stored in the PNV memory and for receiving motor operating signals provided to the motor control for operating the motor, said method comprising the steps of:

providing an interface for operating the programmed motor to emulate performance of the motor driving a component in a specific environment in order to achieve a desired motor performance;

providing to an input port of said interface circuit output signals representative of desired operating parameters for calibrating the motor and for specifying desired motor operating signals for emulating operation of the motor in the specific environment;

interconnecting the motor input and the output port of the interface circuit;

storing the motor operating parameters for calibrating the motor in the PNV memory via the interface output port and via the motor input;

providing motor operating signals for emulating motor operation to the motor control via the interface output port and via the motor input; and measuring an output performance of the motor in response to the motor operating signals;

wherein the interface circuit is responsive to the operator input for varying the motor operating parameters so that the measured output performance corresponds to the desired motor performance whereby motor operation, as controlled by the motor operating parameters in the PNV memory, is in response to the operator input provided so that the motor operation emulates the desired performance when driving the component in the specific environment.

18. The method of claim 17 wherein the interface circuit comprises:

a processor having an input for receiving the output signals representative of the operator input;

a memory connected to the processor and including instructions for controlling the operation of the processor; and a circuit, responsive to the processor, for generating programming signals provided to the motor input which correspond to the motor operating parameters.

19. The method of claim 17 further comprising the step of verifying an electrical integrity of the interconnection between the motor input and the output port of the interface circuit.

20. The method of claim 17 further comprising the step of printing labels indicating the motor operating parameters with which the PNV memory of the motor has been programmed.

21. A method for programming a motor and operating the programmed motor to emulate performance of the motor driving a component in a specific environment in order to achieve a desired motor operating performance, said method comprising the steps of:

connecting a motor in driving relation to the component in the specific environment, said motor having a programmable, non-volatile (PNV) memory storing motor operating parameters which control the motor operation and having a motor control for operating the motor in accordance with the stored motor operating parameters and in response to motor operating signals, said motor having a motor input for accessing the motor operating parameters stored in the PNV memory and for receiving the motor operating signals provided to the motor control for operating the motor;

specifying in response to operator input desired motor operating parameters for calibrating the motor and for specifying desired motor operating signals for emulating operation of the motor in the specific environment;

providing output signals representative of the desired motor operating parameters as defined by the operator input and the desired motor operating signals as defined by the operator input;

providing an interface circuit having an input port receiving the output signals and having an output port connected to and engaging the motor input;

storing the motor operating parameters for calibrating the motor in the PNV memory via the interface output port and via the motor input; and providing the motor operating signals for emulating motor operation to the motor control via the interface output port and via the motor input;

measuring an output performance of the motor in response to motor operating signals; and wherein the interface circuit is responsive to the operation input for varying the motor operating parameters so that the output performance as measured by the measuring step corresponds to the desired motor performance whereby the motor operation is controlled in accordance with the stored motor operating parameters in the PNV memory in response to the motor operating signals as defined by operator input so that the motor operation emulates the desired performance when driving the component in the specific environment.

22. The method of claim 21 further comprising indicating by means for indicating the motor operating parameters with which the PNV memory of the motor has been programmed whereby the means for indicating indicates the desired motor operating parameters corresponding to the desired performance.

23. A system for programming a motor and operating the programmed motor to emulate performance in a specific environment in order to achieve a desired motor performance, said system comprising:

a motor connected in driving relation to a component in the specific environment, said motor having a programmable, non-volatile (PNV) memory storing motor operating parameters which control the motor operation and having a motor control for operating the motor in accordance with the stored motor operating parameters and in response to motor operating signals, said motor having a motor input for accessing the motor operating parameters stored in the PNV-memory and for receiving motor operating signals provided to the motor control for operating the motor;

a computer having input means responsive to operator input specifying desired motor operating parameters for calibrating the motor and for specifying desired motor operating signals for emulating operation of the motor in the specific environment and having an output providing computer output signals representative of the desired motor operating parameters as defined by the operator input and the desired motor operating signals as defined by the operator input; and an interface circuit having an input port connected to the computer output and receiving the computer output signals, said interface circuit having an output port connected to and engaging the motor input, said interface circuit having means for storing the motor operating parameters for calibrating the motor in the PNV memory via the interface output port and via the motor input, and said interface circuit having means for providing the motor operating signals for emulating motor operation to the motor control via the interface output port and via the motor input;

means for measuring an output performance of the motor in response to motor operating signals; and wherein the interface circuit is responsive to the operator input for varying the motor operating parameters so that the output performance as measured by the measuring means corresponds to the desired motor performance whereby the motor operation is controlled in accordance with the stored motor operating parameters in the PNV memory in response to the motor operating signals as defined by operator input provided via the input means so that the motor operation emulates the desired performance when driving the component in the specific environment.

24. The system of claim 23 further comprising means for indicating the motor operating parameters with which the PNV memory of the motor has been programmed whereby the means for indicating indicates the desired motor operating parameters corresponding to the desired performance.

* * * * *

UNITED STATES PATENT AND TRADEMARK OFFICE
CERTIFICATE OF CORRECTION

PATENT NO. : 5,473,229

DATED : December 5, 1995

INVENTOR(S) : William R. Archer et al.

It is certified that error appears in the above-identified patent and that said Letters Patent is hereby corrected as shown below:

Column 11, claim 1, line 3, "operating parameter" should read ---operating parameters---.

Column 12, claim 17, lines 39-42, "signals, providing an interface for operating the programmed motor to emulate performance of the motor driving a component in a specific environment in order to achieve a desired motor performance, said" should read ---signals, said---.

Signed and Sealed this

Twenty-fourth Day of June, 1997

Attest:

BRUCE LEHMAN

*Attesting Officer*

*Commissioner of Patents and Trademarks*